[19] United States Patent
Riegel

[11] 4,346,047
[45] Aug. 24, 1982

[54] PRODUCTION OF PHOSGENE

[75] Inventor: Herbert Riegel, Maplewood, N.J.

[73] Assignee: The Lummus Company, Bloomfield, N.J.

[21] Appl. No.: 947,604

[22] Filed: Oct. 2, 1978

[51] Int. Cl.$^3$ ............................................. C07C 51/58
[52] U.S. Cl. ................................................ 260/544 K
[58] Field of Search .................... 260/544 K, DIG. 42

[56] References Cited

U.S. PATENT DOCUMENTS

| | | | |
|---|---|---|---|
| 2,418,930 | 4/1947 | Gorin | 260/DIG. 42 |
| 2,444,289 | 6/1948 | Gorin et al. | 260/544 K |
| 3,968,050 | 7/1976 | Riegel | 260/DIG. 42 |
| 3,996,273 | 12/1976 | Daumas | 260/544 K |
| 4,119,705 | 10/1978 | Riegel et al. | 423/507 |
| 4,190,639 | 2/1980 | Tsao | 423/491 |

FOREIGN PATENT DOCUMENTS

| | | | |
|---|---|---|---|
| 711287 | 6/1963 | Canada . | |
| 891272 | 3/1962 | United Kingdom | 260/DIG. 42 |

Primary Examiner—Natalie Trousof
Assistant Examiner—L. Hendriksen
Attorney, Agent, or Firm—Elliot M. Olstein; Louis E. Marn

[57] ABSTRACT

A molten salt containing the higher and lower valent chlorides, such as mixture of cuprous and cupric chloride, is contacted with oxygen and hydrogen chloride to enrich the salt in the higher valent metal chloride. The salt enriched in the higher valent metal chloride is contacted with carbon monoxide to both strip gaseous chlorine from the salt and produce phosgene by reaction with carbon monoxide and thereby recover essentially all chlorine values added to the salt. The reaction can be effected to provide stoichiometric quantities of carbon monoxide and chlorine in the effluent for producing additional phosgene.

17 Claims, 1 Drawing Figure

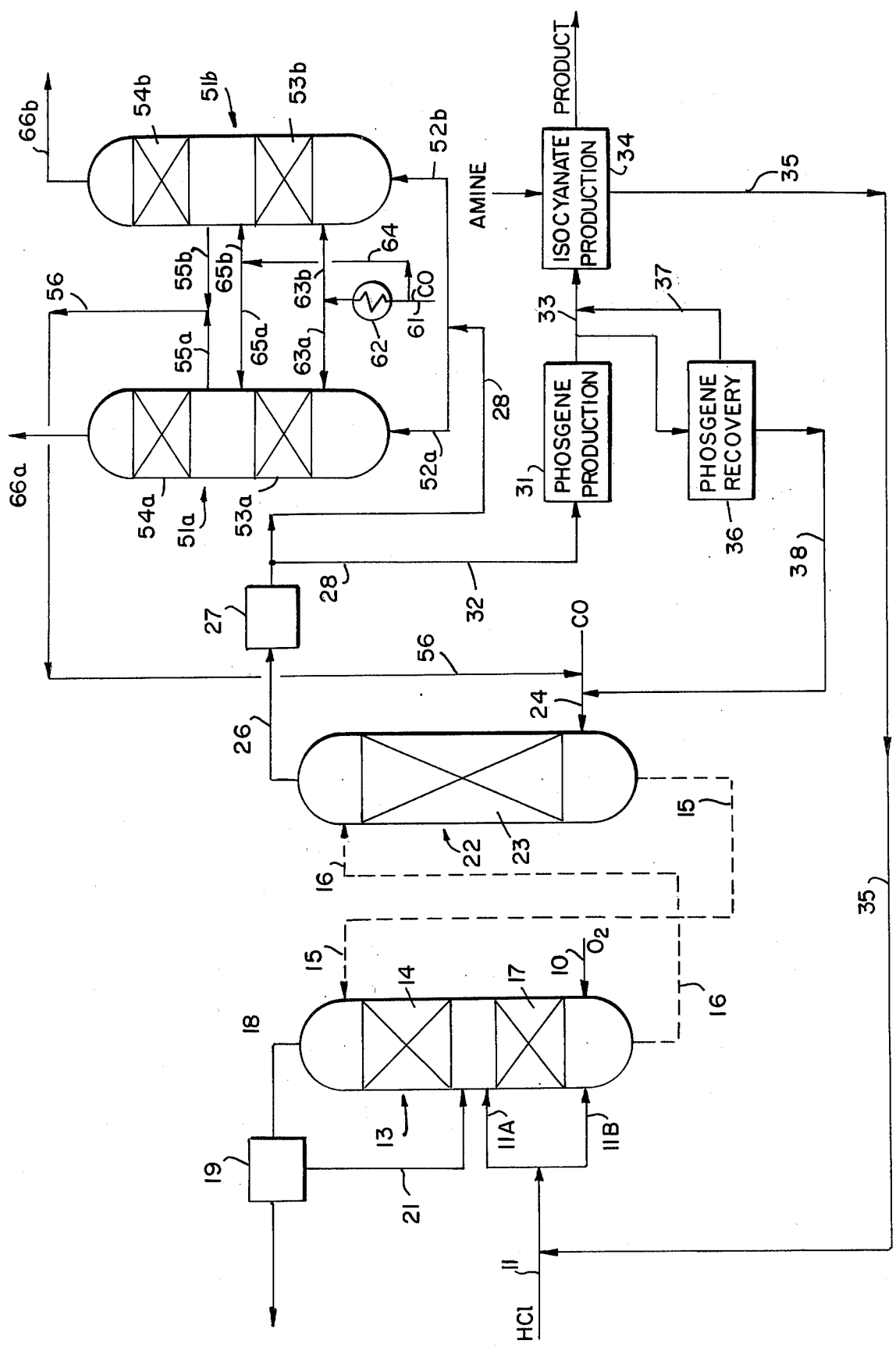

PRODUCTION OF PHOSGENE

This invention relates to the production of phosgene, and more particularly to the production of phosgene from hydrogen chloride at high phosgene yields based on hydrogen chloride.

In accordance with the present invention, a molten salt containing the higher and lower valent chlorides of a multivalent metal is contacted with gaseous oxygen, (either alone or in admixture with another gas(es), such as air), and hydrogen chloride to recover the hydrogen chloride by enriching the higher valent metal chloride content of the molten salt. The molten salt, enriched in the higher valent metal chloride, is then contacted with gaseous carbon monoxide to both strip gaseous chloride from the salt and produce phosgene by reaction with the carbon monoxide, to thereby produce a gaseous effluent containing phosgene, carbon monoxide and chlorine. The contacting with carbon monoxide is effected in a manner to recover essentially all of the chlorine values added to the salt as either phosgene or chlorine.

In accordance with one embodiment, carbon monoxide and chlorine present in the effluent can be further reacted to produce additional phosgene. In accordance with such preferred embodiment, the contacting between molten salt and carbon monoxide can be controlled in a manner to provide carbon monoxide and chlorine in the effluent in about stoichiometric proportions for producing phosgene. The phosgene produced may then be employed in a phosgenation process, such as the production of organic isocyanate from organic amine.

The molten salt contains the higher and lower valent chloride of a multivalent metal; i.e., a metal having more than one positive valent state, such as manganese, iron, copper, cobalt and chromium, preferably copper. In the case of the higher melting multivalent metal chlorides, such as copper chlorides, a metal salt melting point depressant which is non-volatile and resistant to oxygen at the process conditions, such as a metal chloride having only one positive valent state, is added to the mixture to form a molten salt mixture having a reduced melting point. The metal chloride melting point despressant is preferably an alkali metal chloride, such as potassium and lithium chloride, in particular, but it is to be understood that other metal chlorides and mixtures thereof, such as the heavy metal chlorides, (heavier than copper) of groups I, II, III and IV of the Periodic Table; e.g., zinc, silver and thallium chloride, may also be employed. The metal chloride melting point depressant is added in an amount sufficient to maintain the salt mixture as a melt at the reaction temperatures, and is generally added in an amount sufficient to adjust the solidification point of the molten salt mixture to a temperature below about 550° F. The preferred melting point depressant is potassium chloride.

The reaction between the molten salt, containing the higher and lower valent chlorides of a multivalent metal, preferably a mixture of cuprous and cupric chloride, with hydrogen chloride and oxygen is generally effected at a pressure in the order of from about 1 atm to about 20 atm, and preferably at a pressure of from 3 atm to about 6 atm. The reaction is effected at a salt inlet temperature generally in the order of from about 750° F. to about 950° F., and preferably from about 770° F. to about 840° F. The concentration of the higher valent metal chloride in the salt, prior to contacting, is generally at a value to provide a higher valent metal chloride to total metal mole ratio in the order of from about 0.15:1 to about 0.6:1, preferably of from 0.35:1 to about 0.5:1.

The molten salt, now enriched in the higher valent metal chloride, is then subjected to a dechlorination-phosgene production reaction in order to recover essentially all of the chlorine values added to the salt. The dechlorination-phosgene production reaction is generally effected at a pressure in the order of from about 0.1 atm to about 5 atm. The molten salt feed to the dechlorination-phosgene production reaction is generally at a temperature of from about 800° F. to about 950° F., and preferably from about 875° F. to about 930° F. The concentration of the higher valent metal chloride in the salt subjected to the dechlorination-phosgene production reaction is generally at a value to provide a high valent metal chloride to total metal mole ratio of from about 0.5:1 to about 0.7:1, and preferably from about 0.55:1 to about 0.6:1. The residence times are selected to provide the desired conversion.

The dechlorination-phosgene production is effected by the use of gaseous carbon monoxide, with the gaseous carbon monoxide being employed to both chemically combine with chlorine values present in the salt to produce phosgene, and to strip the added chlorine values from the salt, as gaseous chlorine, and thereby recover all of the chlorine values added to the salt. The salt inlet temperature to the oxidation reactor is generally at least 100° F. less than the inlet temperature to the phosgene production-dechlorination reactor, with the salt inlet temperature to the oxidation reactor generally being from 120° F. to 180° F. less than the salt inlet temperature to the phosgene production-dechlorination reactor.

In accordance with one embodiment of the present invention, it has been found that it is possible to recover essentially all of the chlorine values added to the salt, while employing about stoichiometric amounts of carbon monoxide for converting all of such added chlorine values to phosgene, whereby the effluent gas contains phosgene, and carbon monoxide and chlorine in about stoichiometric proportions for phosgene production. In this manner, all of the added chlorine values can be converted to phosgene without the necessity of effecting recycle of carbon monoxide. In particular, it has been found that by operating the dechlorination-phosgene production reactor under a vacuum, at the hereinabove described temperature conditions, it is possible to employ about stoichiometric amounts of carbon monoxide to effect recovery of all of the added chlorine values. In general, such pressures are in the order of from 0.1 atm to 0.5 atm. It is to be understood that the about stoichiometric proportions of carbon monoxide includes a slight excess of carbon monoxide, whereby the mole ration of carbon monoxide to added chlorine values in the salt, expressed as $Cl_2$ is from 1:1 to 1.05:1. As a result, the mole ratio of carbon monoxide to chlorine in the effluent from the dechlorination-phosgene production reactor is also in the order of from 1:1 to 1.05:1. The carbon monoxide and chlorine present in the effluent may be further reacted to produce additional phosgene by procedures known in the art. As known in the art, for example, such phosgene can be generated by the use of an activated carbon catalyst. In general, such phosgene production is effected at temperatures in the order of from about 150° F. to about 300° F., and at pressures in the order of from about 1 atm to about 2 atm.

The phosgene produced in both the molten salt reactor and additional phosgene production reactor may then be employed in a phosgenation process; e.g., the production of isocyanate.

It is to be understood that it is also possible to employ carbon monoxide in excess of about stoichiometric quantities. In such a case, carbon monoxide would be recovered from the effluent from the further phosgene production reactor for recycle to the molten salt reactor. In such case, the effluent gas from the phosgene generation is then subjected to a recovery operation in order to separate phosgene therefrom. The phosgene may be separated from the gas, for example, by cooling the mixture to below the boiling point of phosgene which is about 8.2° C. The separation may be effected under pressure, in which case higher temperature cooling could be employed. Procedures for recovering phosgene from a gas are known in the art, and no further details in this respect are deemed necessary for a complete understanding of the present invention.

After separation of the phosgene, the remaining gas, which is carbon monoxide, which can contain small amounts of phosgene, can be recycled to the phosgene production-dechlorination reaction in order to function as a stripping gas for stripping chlorine from the molten salt.

It is to be understood that the present invention could be effected in a manner by which the phosgene withdrawn from the phosgene production-dechlorination reactor is separated from the effluent, prior to reaction of the chlorine with carbon monoxide to produce additional phosgene.

In accordance with such an embodiment, the gaseous effluent containing carbon monoxide, chlorine and phosgene, withdrawn from the phosgene production-dechlorination reaction zone, is contacted with an activated carbon adsorbent under adsorption conditions in order to adsorb chlorine and phosgene from the effluent. In accordance with this embodiment, the adsorption is effected at a temperature in the order of from about 50° F. to about 125° F., preferably from about 70° F. to about 100° F., and at pressures in the order of from about 5 atm to about 10 atm. As a result of such contact, the chlorine and phosgene are adsorbed on the activated carbon, and the unadsorbed carbon monoxide may be recycled to the phosgene production-dechlorination reaction zone to function as a stripping gas for stripping chlorine from the molten salt. Periodically, the activated carbon, containing adsorbed phosgene and chlorine, is contacted with carbon monoxide at desorption conditions in order to desorb the previously adsorbed phosgene and chlorine. In general, such desorption of phosgene is effected at a temperature in the order of from about 150° F. to about 300° F., preferably from about 200° F. to about 250° F., and at pressures in the order of from about 1 atm to about 2 atm. At such conditions, in the presence of activated carbon, the chlorine reacts with carbon monoxide to produce phosgene. In order to insure reaction between the carbon monoxide and chlorine, in general, there is provided an additional bed of activated carbon, with heated carbon monoxide being employed to effect the desorption of phosgene and chlorine from the activated carbon adsorbent, followed by addition of further carbon monoxide and contact with further activated carbon to effect completion of the conversion of the desorbed chlorine to phosgene. Such further carbon monoxide is generally employed at a temperature to provide a cooling effect to prevent an excessive temperature increase from the exothermic phosgene production. A reaction effluent containing phosgene, if required, may be subjected to a recovery operation in order to recover the phosgene reaction product.

In accordance with the present invention, it is possible to achieve high phosgene yields, based on hydrogen chloride feed. In general, it is possible to achieve phosgene yields in the order of from 90 mol percent to 99 mol percent, based on hydrogen chloride.

The drawing is a simplified schematic flow diagram of an embodiment of the invention.

Referring to the drawing, there is shown an oxidation reactor 13, containing means for increasing gas-liquid contact, such as packed beds 14 and 17. Hydrogen chloride in line 11 is provided to oxidation reactor 13 through lines 11A and 11B and oxygen (generally as air) is provided through line 10, with oxygen and hydrogen chloride being introduced below bed 17 and additional hydrogen chloride being introduced between beds 14 and 17. Oxygen and sufficient hydrogen chloride are introduced below bed 17 to insure as far as possible that the molten salt withdrawn from the reactor is free of copper oxychloride (copper oxide) with the oxygen introduction preventing hydrogen chloride from being picked-up by the molten salt. The presence of Cu O and hydrogen chloride in the dechlorination-phosgene production reactor leads to water formation, which can react with the phosgene to produce hydrogen chloride and carbon dioxide.

A molten salt mixture, containing cupric and cuprous chloride, and further including a melting point depressant, in particular, potassium chloride is introduced into reactor 13 through line 15 to countercurrently contact the gases introduced into the reactor through lines 10 and 11. The reactor 13 is operated at the conditions hereinabove described, and as a result of the countercurrent contact between the molten salt mixture and the gases introduced through lines 10 and 11, the hydrogen chloride is oxidized to chlorine, and such chlorine values are recovered by the molten salt by enriching the cupric chloride content of such molten salt.

A gaseous effluent, containing any unreacted oxygen, inerts, such as nitrogen introduced with the oxygen containing gas, equilibrium amounts of hydrogen chloride and some chlorine is withdrawn from reactor 13 through line 18 and introduced into a recovery zone schematically indicated as 19 to effect recovery of hydrogen chloride. The recovery zone for recovering hydrogen chloride may be as described in U.S. Pat. No. 3,968,200, which is hereby incorporated by reference. Recovered hydrogen chloride, generally as an aqueous solution thereof, is withdrawn from recovery zone 19 through line 21 and introduced into reactor 13 to effect oxidation thereof to enrich the molten salt in cupric chloride.

Molten salt enriched in cupric chloride and free of copper oxide is withdrawn from reactor 13 through line 16 and introduced into a phosgen production-dechlorination reactor 22, containing suitable means for increasing gas liquid contact, such as a packed bed 23. Carbon monoxide is introduced into the bottom of reactor 22 through line 24.

Reactor 22 is operated at the conditions hereinabove described, with the carbon monoxide functioning to both chemically react with chlorine values present in the salt to produce phosgene and to strip chlorine from the salt, as gaseous chlorine. As hereinabove noted, carbon monoxide is introduced in an amount and the reactor is operated at conditions to provide recovery of all of the chlorine values added to the salt in oxidation reactor 13, with such chlorine values being recovered as phosgene and chlorine.

Molten salt, having a reduced content of cupric chloride, is withdrawn from reactor 22, and recycled to reactor 13 through line 15.

A gaseous effluent, containing carbon monoxide, chlorine and phosgene is withdrawn from reactor 22 through line 26, and further treated in a separation zone 27 to remove any vaporized salt therefrom. Such vaporized salt may be removed as described in U.S. application Ser. No. 870,351, filed on Jan. 18, 1978, and hereby incorporated by reference.

A gaseous effluent, withdrawn from separation zone 27, containing phosgene, chlorine and carbon monoxide, in line 28 may be treated in accordance with alternative embodiments of the present invention.

In accordance with a preferred embodiment, the gas in line 28 contains about stoichiometric proportions of carbon monoxide and chlorine, as well as phosgene, and such gas is introduced into a phosgene production reactor 31 through line 32.

A phosgene gas is withdrawn from reactor 31 through line 33 and introduced along with an amine, such as toluene diamine, into an isocyanate production zone, generally indicated as 34, wherein as known in the art, the amine is converted to an isocyanate; e.g., toluene diisocyanate, with hydrogen chloride being produced as by-product. The hydrogen chloride by-product is recycled to the oxidation reactor 13 through line 35.

In accordance with a further embodiment, the gas in line 28 contains a stoichiometric excess of carbon monoxide and as a result the effluent from the phosgene production reactor 31 contains such excess carbon monoxide, which is recovered in a phosgene recovery zone 36. Such recovery may be effected, for example, by cooling at an elevated pressure to condense phosgene. The phosgene is withdrawn from recovery zone 36 through line 37 for introduction into the isocyanate production zone. Recovered carbon monoxide, in line 38, is recycled to reactor 22.

In accordance with an alternative embodiment, the gas in line 28 may be introduced into one of two vessels, 51a or 51b, through lines 52a or 52b with such vessels being employed to effect adsorption of chlorine and phosgene and react the chlorine with carbon monoxide to produce additional phosgene. Each of the vessels 51a and 51b includes first and second beds of activated carbon 53a and 53b, and 54a and 54b, respectively. For the purpose of describing the embodiment, vessel 51a is on the adsorption cycle and vessel 51b is on the desorption-phosgene production cycle, and as should be apparent the vessels are switched between such cycles.

The gas introduced into vessel 51a through line 52a passes through activated carbon bed 53a, which is operated at adsorption conditions, as hereinabove described, whereby chlorine and phosgene present in the gas are adsorbed by bed 53a. The unadsorbed gas namely, carbon monoxide is withdrawn from vessel 51a through line 55a and recycled to reactor 22 through line 56.

In reactor 51b, a first portion of carbon monoxide in line 61 is passed through heater 62 and introduced into reactor 51b through line 63b for passage through bed 53b. The temperature of the carbon monoxide is adjusted such that bed 53b is operated at the desorption conditions as hereinabove described whereby the carbon monoxide introduced through line 63b desorbs previously adsorbed phosgene and chlorine with some of such chlorine also reacting with the carbon monoxide to produce phosgene.

A second portion of carbon monoxide in line 64, which is unheated, is introduced through line 65b above bed 53b and below bed 54b. Such carbon monoxide functions to regulate the temperature during the desorption-phosgene production portion of the cycle. The carbon monoxide introduced through line 65b and gases withdrawn from bed 53b pass through bed 54b, operated at phosgene production conditions as hereinabove described wherein desorbed chlorine reacts with carbon monoxide to produce phosgene. A gaseous effluent, containing phosgene is withdrawn from reactor 51b through line 66b and such phosgene may be employed in a phosgenation reaction.

The present invention is particularly advantageous in that it is possible to effectively convert hydrogen chloride to phosgene, at high phosgene yields, based on hydrogen chloride.

In addition, it is possible to recover all of the chlorine values added to a molten salt as phosgene and chlorine, without recycle of carbon monoxide.

Numerous modifications and variations of the present invention are possible in light of the above teachings and, therefore, within the scope of the appended claims, the invention may be practiced otherwise than as particularly described.

What is claimed is:
1. A process for producing phosgene, comprising:
 (a) contacting a molten salt mixture containing the higher and lower valent chlorides of a multivalent metal with hydrogen chloride and oxygen to enrich the salt in the higher valent metal chloride;
 (b) contacting the molten salt from step (a) with carbon monoxide to strip gaseous chlorine from the salt and produce phosgene by reaction with carbon monoxide, said contacting being effected to recover essentially all of the chlorine values added in step (a) as phosgene and chlorine; said contacting being effected under a vacuum, with the carbon monoxide being employed in about stoichiometric proportions to chlorine values added to the molten salt in step (a);
 (c) passing molten salt from step (b) to step (a); and
 (d) recovering a gaseous effluent from step (b) containing carbon monoxide, stripped chlorine and phosgene, said carbon monoxide and chlorine being present in the effluent in about stoichiometric proportions for phosgene production.

2. The process of claim 1 wherein Step (b) is effected at a pressure of from 0.1 to 0.5 atm and a molten salt inlet temperature of from 800° to 950° F.

3. The process of claim 2 wherein step (a) is effected at a temperature of from 750° F. to 950° F. and a pressure of from 1 to 20 atm.

4. The process of claim 3 wherein the molten salt mixture introduced to step (a) is at a temperature of at least 100° F. less than the temperature of the molten salt mixture introduced into step (b).

5. The process of claim 4 wherein the molten salt mixture employed in Step (b) is essentially free of metaloxide and hydrogen chloride.

6. The process of claim 5 wherein the molten salt mixture contains cupric chloride and cuprous chloride.

7. A process for producing phosgene, comprising:
(a) contacting at a temperature of from 750° F. to 950° F., a pressure of from 1 to 20 atm a molten salt mixture containing the higher and lower valent chlorides of a multivalent metal with hydrogen chloride and oxygen to enrich the salt in the higher valent metal chloride;
(b) contacting at a temperature of from 800° F. to 950° F. and a pressure of from 0.1 atm to 5 atm the molten salt from step (a) with carbon monoxide to strip gaseous chlorine from the salt and produce phosgene by reaction with carbon monoxide, said contacting being effected to recover essentially all of the chlorine values added in step (a) as phosgene and chlorine;
(c) passing molten salt from step (b) to step (a); and
(d) recovering a gaseous effluent from step (b) containing carbon monoxide, stripped chlorine and phosgene.

8. The process of claim 7 wherein the molten salt mixture introduced to Step (a) is at a temperature of at least 100° F. less than the temperature of the molten salt mixture introduced into Step (b).

9. The process of claim 8 wherein the molten salt mixture employed in Step (b) is essentially free of metal oxide and hydrogen chloride.

10. The process of claim 9 wherein the molten salt mixture contains cupric chloride and cuprous chloride.

11. The process of claim 8 wherein carbon monoxide is employed in Step (b) in stoichiometric excess of the chlorine values added to the salt in Step (a).

12. The process of claim 7 wherein the gaseous effluent contains a stoichiometric excess of carbon monoxide, said gaseous effluent being contacted under adsorption conditions with activated carbon to adsorb phosgene and chlorine, and subsequently contacting the activated carbon containing adsorbed phosgene and chlorine with carbon monoxide under desorption and phosgene production conditions to desorb phosgene and convert adsorbed chlorine to phosgene.

13. The process of claim 12 wherein unadsorbed carbon monoxide is passed to Step (b).

14. The process of claim 13 wherein Step (a) is effected at a temperature of from about 750° F. to about 950° F., a pressure of from 1 atm to 20 atm and Step (b) is effected at a temperature of from about 800° F. to about 950° F. and a pressure of from 0.1 atm to 5 atm.

15. The process of claim 14 wherein the molten salt mixture introduced to Step (a) is at a temperature of at least 100° F. less than the temperature of the molten salt mixture introduced into Step (b).

16. The process of claim 15 wherein the molten salt mixture employed in Step (b) is essentially free of metal oxide and hydrogen chloride.

17. The process of claim 16 wherein the molten salt mixture contains cupric chloride and cuprous chloride.

* * * * *